United States Patent [19]
Chiu

[11] Patent Number: 5,931,914
[45] Date of Patent: *Aug. 3, 1999

[54] APPARATUS FOR COMMUNICATION PROTOCOL PROCESSING UTILIZING A STATE MACHINE LOOK UP TABLE

[75] Inventor: Yu-Min Chiu, Hsinchu, Taiwan

[73] Assignee: Industrial Technology Research Institute, Taiwan

[ * ] Notice: This patent is subject to a terminal disclaimer.

[21] Appl. No.: 08/045,970

[22] Filed: Apr. 9, 1993

[51] Int. Cl.$^6$ .................................................. G06F 15/16
[52] U.S. Cl. ............................................................ 709/230
[58] Field of Search ............................. 395/200, 200.6; 370/54, 60, 363, 368, 371, 374, 378, 381, 382, 383; 379/221

[56] References Cited

U.S. PATENT DOCUMENTS

| | | | |
|---|---|---|---|
| 4,720,850 | 1/1988 | Oberlander et al. ...................... | 370/60 |
| 4,864,492 | 9/1989 | Blakely-Fogel et al. ................ | 395/200 |
| 4,882,699 | 11/1989 | Evensen .................................... | 379/221 |
| 5,218,676 | 6/1993 | Ben-Ayed et al. ....................... | 395/200 |
| 5,293,488 | 3/1994 | Riley et al. ............................... | 395/200 |

*Primary Examiner*—Richard L. Ellis
*Attorney, Agent, or Firm*—Finnegan, Henderson, Farabow, Garrett & Dunner, L.L.P.

[57] ABSTRACT

The present invention comprises a data processor capable of communicating with at least another data processor among a plurality of networked processors and the data processor comprises a communication state means for receiving and sending a plurality of messages relating to performing the communication with the networked data processor(s). The communication state means includes a table-look-up means and a nested-selection means wherein each of the means is capable of receiving and utilizing the messages for identifying a processor communication state of the data processor. The table-look-up means and the nested-selection means of the communication state means are optimized to perform the process of identifying the processor communication state in a logic sequence for minimizing the time required in performing the identifying process whereby the communication among the networked data processors may be more efficiently performed.

6 Claims, 9 Drawing Sheets

|   | S1 | S2 | S3 | S4 | S5 | S6 | S7 |
|---|---|---|---|---|---|---|---|
| E1 |  |  |  | • | • |  |  |
| E2 |  | • |  |  | • | • | • |
| E3 | • |  |  |  |  |  |  |
| E4 |  | • | • |  |  | • | • |
| E5 |  |  | • | • | • | • | • |
| E6 |  | • | • |  |  |  |  |
| E7 |  | • | • | • | • | • | • |

FIG. 9A

|   | S1 | S2 | S3 | S4 | S5 | S6 | S7 |
|---|---|---|---|---|---|---|---|
| E1 |  |  |  | • | • |  |  |
| E2 | • |  |  |  |  |  |  |
| E3 |  | • | • |  |  |  |  |
| E4 |  | • | • | • | • | • | • |

FIG. 9B

| state\event | S1 | S2 | S4 | S4 | S5 | S6 |
|---|---|---|---|---|---|---|
| E2 |  | • |  | • | • | • |
| E4 |  | • |  |  | • | • |
| E5 |  |  |  | • | • | • |

FIG. 9C

| state\event | S2 | S5 | S6 | S7 |
|---|---|---|---|---|
| E2 | • | • | • | • |
| E4 | • |  | • | • |
| E5 |  | • | • | • |

FIG. 9D

APPARATUS FOR COMMUNICATION PROTOCOL PROCESSING UTILIZING A STATE MACHINE LOOK UP TABLE

BACKGROUND OF THE INVENTION

1. Field of the Invention

This invention relates generally to network interface and the tasks performed by the interface to enable the communication between inter-connected computers. More particularly, this invention relates to the interface system and method that the network communications may be more efficiently performed.

2. Description of the Prior Art

Since computer networks and their applications now place ever greater demand for transmitting large volume of data in very high speed among networked data processors/computers, the requirement that two inter-connected data processors must utilize the 'communication protocols' to setup appropriate system configurations and procedures in order to carry out the network data exchange. The protocol process may be quite complicated and often become a bottleneck of data transmission. This situation is even more intensified with the emerging multi-media applications wherein more video, audio and other types of data are to be shared and exchanged among the networked data processors for 'real time' process and display.

When a plurality of processors are connected as a network to exchange data messages, a set of procedural rules are set forth as the communication protocols. Every networked processing entity must follow this set of procedural rules, i.e., the protocol, which serves as the common language between these processors for communication with each other. In order to properly follow the communication protocol for setting up communication session between two processors in a network, each of the networked processors are often represented as a 'finite state' machine. The operational states of these processors are cataloged as a 'state table'. Depending on the operation conditions of each of the processors, each processor is identified as being in a specific state.

The communication protocol generally has two modes, i.e., a 'connectionless' mode and a 'connection-oriented' mode. In a connectionless mode, the sending and receiving processors can communicate by sending and receiving data from each other without requiring that a 'connection' be established first. Under that circumstance, each processing entity invokes a finite state machine comprising only two states, i.e., an inactive state and an active state. The transmission of messages among these two processing entities begins when both entities are in active state. Such protocol mode is very simple and can be easily implemented. However, it has several disadvantages because there are no safeguard against erroneous data transmission and no status monitoring and reporting of the communication processes.

On the other hand, if two networked processors attempt to exchange data in a connection-oriented mode, then a 'connection' must be established first. When a data processor receives a 'connection-oriented' message from another networked processor requesting communication, the message is a protocol message containing a request to the receiving processor that a special sequence of steps are to be executed by the sending and the receiving processors so that the communication can be properly achieved. The finite state machine in such a connection-oriented mode is represented by a more complex state table which comprises more state-event entries. Table 1 shows a specific example of a state table, i.e., the state table of ISO 8073 Class-4 Over CLNS. The states of the processor are listed in Table 1 as a two-dimensional array wherein each processor can be in one of many 'states' and in that state the processor may perform different events depending on the protocol definition of the processor. Table 1 is only a state table for one of possible seven layers of a processor and there are state tables like Table 1 for each layer.

FIG. 1 is a flow-chart showing the sequence the steps that a processor carries out in the process of performing a communication with other processors under a 'connection-oriented' protocol mode. Once a processor receives a connection-oriented message via a 'connection_id', and 'request' (step 10) to initiate a communication process, based on the requested connection_id contained in the received request, a corresponding finite state machine is activated (step 12). In order to properly process the message received, the event in the state table as requested by the 'request' (step 10) must be identified (step 14). The purpose for identifying the event in the state table is to enable the processor to execute a sequence of processing steps according to the rules of communication protocol. Based on the state in the state table as determined by step 12, proper actions are activated (step 16). This sequence of actions are developed and implemented in the finite state machine represented by the state table based on a set of predefined rules according to the communication protocols. After these actions are executed (step 18), the finite state machine may change the state of the FSM (step 20) according the actions as defined by the state table. The process for communication according to the connection-oriented message is completed (step 22) and the protocol entity is ready to receive and process another message including 'connection_id' and 'request' (step 10).

In the process of determining which actions to be executed by the processor in identifying a specific state-event in a state table (step 16), a conventional method most commonly used is by configuring the state table as an two-dimensional array. The first dimension is for identifying an 'event' and the second dimension is for identification of a 'state' under that 'event' in a state table. Each element of that array is associated with a procedure name. The procedure name is used to invoke an executable statement segment which performs a sequence of actions as defined by the state table under that specific 'state' and 'event'.

This method has several disadvantages. The first disadvantage of this method is that the two-dimensional array requires substantial memory space on a data processor for storage. The memory requirement is increased because size of the state tables expands when the structure and functions of a modern processor and the associated communication protocol become more complicate. In addition to the data storage requirement, extra processing time, search time and access time may also likely to increase as the array is increased in size. This further impedes efficient data communication between processors.

In addition to the aforementioned disadvantages, the table-lookup array method may also be very inefficient because in a state table, there are many 'null elements' in the table-lookup array where the 'event' under a processor state is an empty set which often occurs when it is impossible for a processor to be in that condition under certain state as defined by the state table. As a matter of fact, as the state table expands when the protocol becomes more complex, more null elements are added to the array. The table-lookup method thus wastes more unnecessary data storage space and search time in storing and processing these null elements in the state tables.

In order to avoid this problem, a nested-select method is used to implement the state table. Each event in a state table corresponds to a procedure name. Each state under a event in the state table is implemented by a separate statement segment. Each statement segment thus define the actions to be carried out under a specific state of a event. These statement segments are embed in a nested-select procedure. The procedure executes a series of 'if_else' logic steps which sequentially determines a proper state corresponding to the current state of the FSM. Once the specific state is determined, the actions as defined by the appropriate statement segment name corresponding to the event under the selected state are executed.

In order to expeditiously perform the communication between the processors, the states which have higher probability of occurrence should be placed in position within the nested-selected procedure such that the if_else tests can be performed on these states as soon as possible. However, the probability of occurrence of the states corresponding to a specific event may not be predicted initially. Under these circumstances, the benefit of priority arrangement may not be realized. Furthermore, if there are many states corresponding to a requested event, the nested-select program may become very large and cumbersome. Especially, under some conditions, same sequence of actions are to be executed for several event-state entries in the state table, the storage space may be wasted by using this conventional nested-select method because more duplicate statement segments are embed in a series of procedures. Meanwhile, unless proper priority arrangement is made, this method may require substantial processing time if the nested select program is expanded to contain a large number of logic steps.

For those skilled in the art, the prior art still present several limitations in the implementation of a finite state machine corresponding to a more complicated state table. Under either the table-lookup array method or the nested-select programming techniques, efficient use of the memory storage space and processing time are not achieved. Therefore, a need still exists in the art of communication among networked processors for an improved technique in implementing a finite state machine for more efficient protocol interface in order to overcome these limitations.

SUMMARY OF THE PRESENT INVENTION

Therefore, one object of the present invention is to provide a system and method to expeditiously perform the communication between networked data processors whereby the difficulties as encountered by the prior art can be resolved.

Another object of the present invention is to provide a more efficient finite state machine implementation thus allowing a processor to dynamically search the state table utilizing the communication protocol whereby the time wasted in useless search can be reduced.

Another object of the present invention is to provide a system and method for communication interface between networked computers wherein the finite state table is configured and used in a more efficient manner whereby the memory requirement for data storage is reduced Briefly, in a preferred embodiment, the present invention comprises a data processor capable of communicating with at least another data processor among a plurality of networked processors and the data processor comprises a communication state means for receiving and sending a plurality of messages relating to performing the communication with the networked data processor(s). The communication state means includes a table-look-up means and a nested-selection means wherein each of the means is capable of receiving and utilizing the messages for identifying a processor communication state of the data processor. The table-look-up means and the nested-selection means of the communication state means are optimized to perform the process of identifying the processor communication state in a logic sequence for minimizing the time required in performing the identifying process whereby the communication among the networked data processors may be more efficiently performed.

One advantage of the present invention is that it provides a more efficient finite state machine implementation thus allowing a processor to dynamically search the state table utilizing the communication protocol whereby the time wasted in useless search can be reduced.

Another advantage of the present invention is that it provides a system and method for communication interface between networked computers wherein the finite state table is configured and used in a more efficient manner whereby the memory requirement for data storage is reduced These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 9A, 9B, 9C, and 9D shows the processes of dividing the state table into table lookup portion and the nested-select portion and the performance of null_state elimination on the table lookup portion.

DETAILED DESCRIPTION OF THE PREFERRED EMBODIMENT

Figure 2:
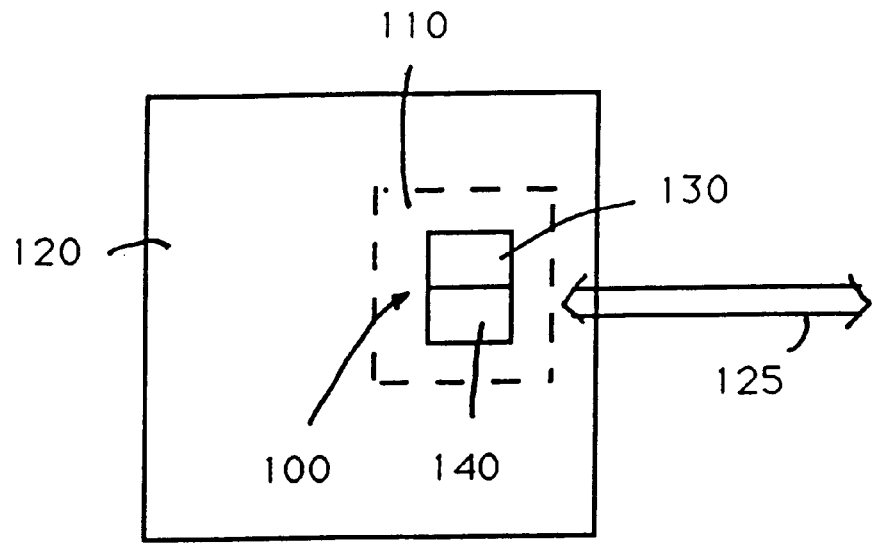
FIG. 2 is a block diagram of a data processor comprising a finite state machine for enabling the performance of the communication tasks.
Figure 3:
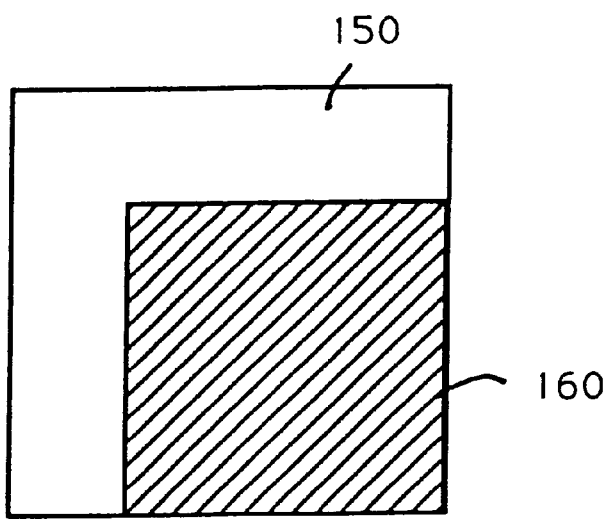
FIG. 3 shows a state table which is divided into two major parts according to the present invention.

FIG. 2 shows a communication state means 100 implemented for a finite state machine 110 residing in a processor 120 which is networked with other processors (not shown) through certain network means 125 whereby data messages can be transmitted between the processor 120 and other networked processors through the network means 125. The communication state means 100 comprises a table lookup means 130 and a nested select means 140 to operate on a state table which can be conceptually divided into two distinct portions, i.e., table lookup array portion 150 and the nested select portion 160 as shown in FIG. 3.

The communication state machine 100 performs two major distinct processing steps to search a state table in response to a communication request to determine a valid state for the current finite state machine 110. The nested select means 140 is employed to perform a series of logic processes for the data in the nested select portion 160 of the state table first. The table lookup means is then used to search the data array contained in the table lookup portion 150.

The finite state machine 110 according to the present invention utilizes the facts that the incoming requested events for performing communication as included in different states as listed in the state tables have certain specific predictable patterns. By properly arranging the order and the logic steps, very efficient finite state machine can be implemented wherein the memory requirement and processing time can be reduced while the communication tasks can be more efficiently performed. Specifically, these predictable patterns of events as distributed among different states in the state table are:

1. Certain events are included in only a few states;
2. The probability of event occurrence of some events under different states can be pre-determined according to the procedural rules as defined in the communication protocol;
3. Certain events appear in almost every state in a state table and the action to be executed are identical in almost every entry in the state table; and
4. Certain states include events which execute almost identical sequence of actions for all the events under these states.

Figure 4:
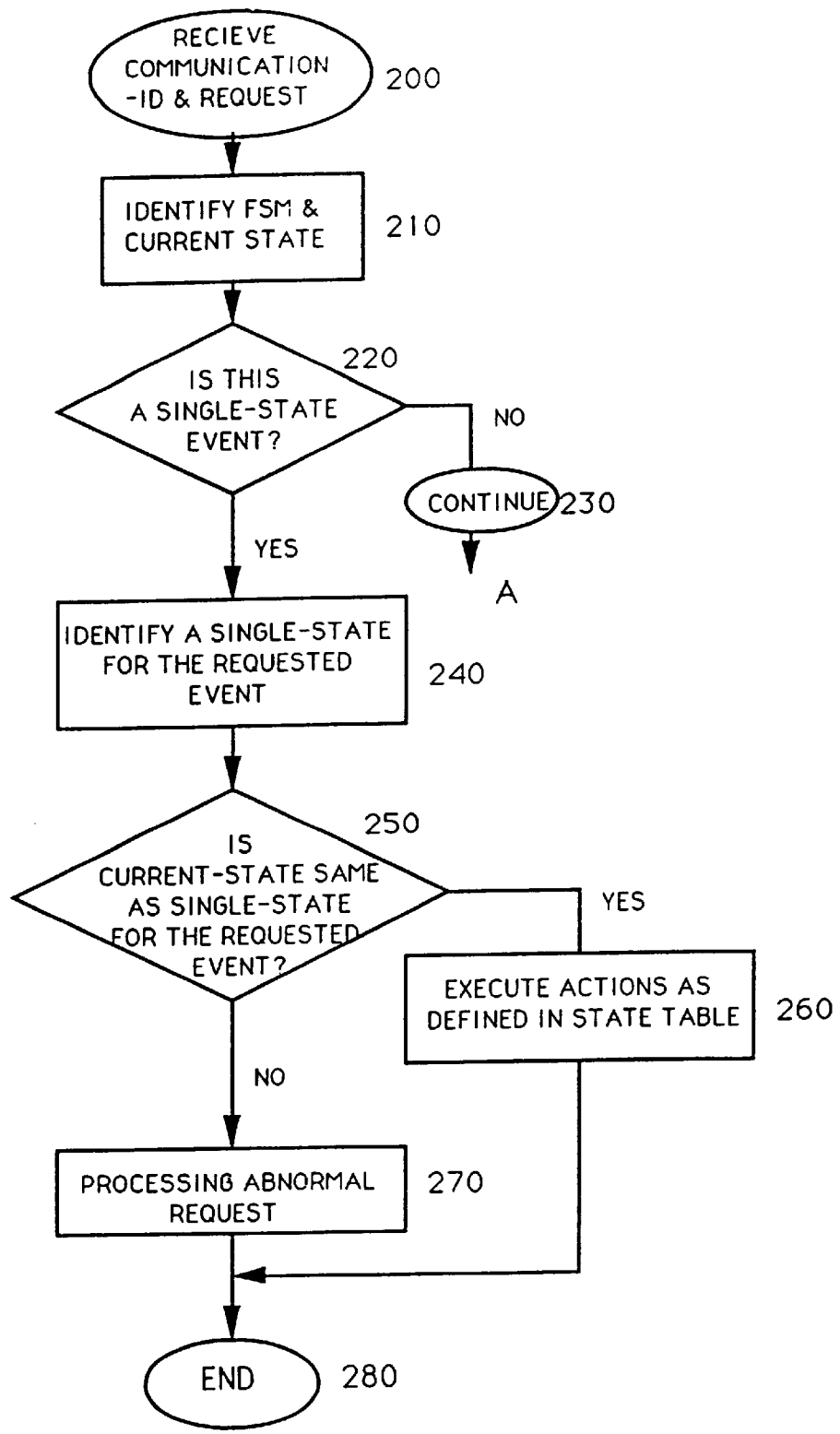
FIG. 4 shows a flow chart of a logic process for processing a single_state_events.

FIG. 4 shows the first logic process performed by the nested-select means 140. An incoming request comprising a connection_id and a requested event is received in step 200. A finite state machine with a current state is identified (step 210). A test is performed in step 220 to determine whether the event is a single_state event, if it is not, then proceed with step 230 wherein next sequence logic steps as denoted by A will be continued. If the requested event is a single_state event, a single state for that event is identified (step 240). The current state is compared with that single state for the requested event in step 250. If the result is true, then the actions as specified in the state table under the identified state and event are executed (step 260). Otherwise, a process to manage abnormal communication request is invoked (step 270) before the process ends (step 280).

Figure 5:
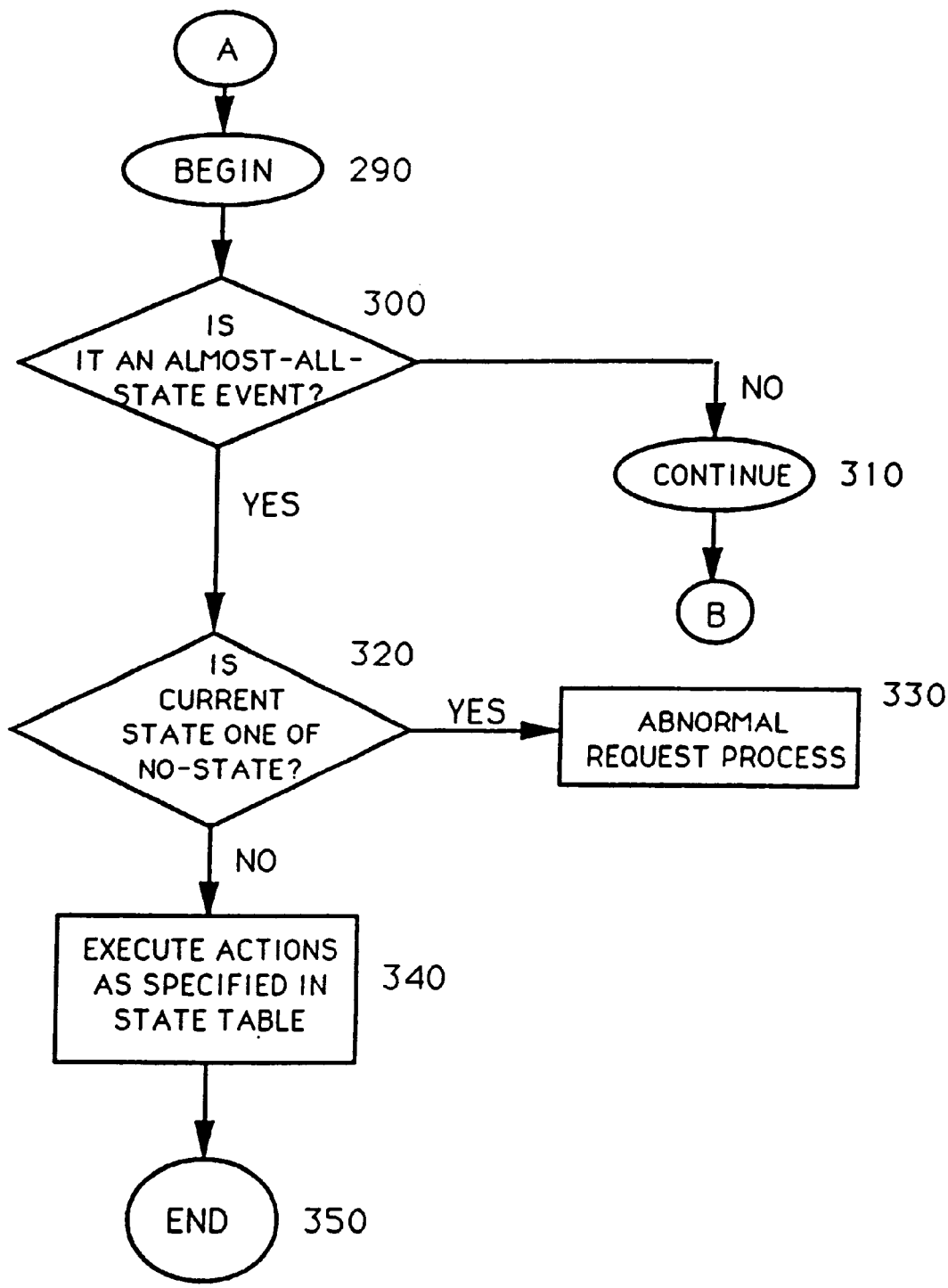
FIG. 5 shows a flow chart of a logic process for processing an almost_all_state_event.

FIG. 5 shows another logic process. This logic step can begin (step 290) with either the requested connection_id and event as specified by steps 200 and 210 in FIG. 4, or it can continue the process following step 230, i.e., A. A test is performed in step 300 to determine if the requested event is an almost_all_state event, i.e., the type of events that can appear in almost every state in the state table and the actions to be executed are identical in almost every entry in the state table. This type of event often occurs when a set of protocol procedures are to be executed during abnormal communication conditions. If the requested event is not an almost_all_state event, then it proceeds with step 310 to continue the process of next logic step as denoted by B. Otherwise, a test is performed in step 320 to determine if current state is among one of these states that this event cannot appear, i.e., a 'no_state'. If the test result is false, then the actions as defined by the event and state as included in the state table are executed (step 340). Otherwise, a process to manage abnormal communication request is invoked (step 330) before the process ends (step 350).

Figure 6:
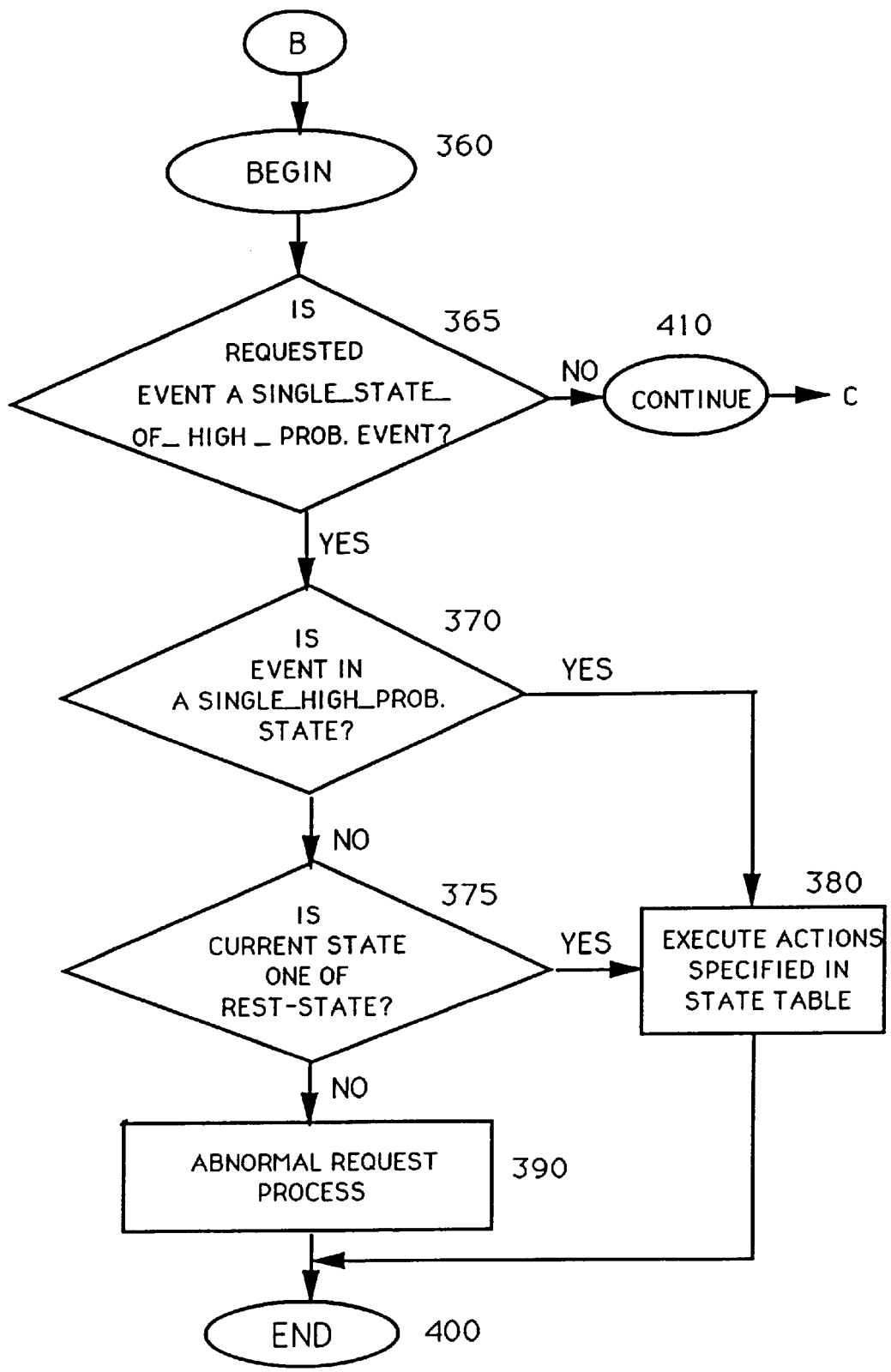
FIG. 6 shows a flow chart of a logic process for processing a single_state_of_high_probability_event.

FIG. 6 shows another logic process. This logic process can begin (step 360) with either the requested connection_id and event as specified by steps 200 and 210 in FIG. 4, or it can continue with the process following step 310, i.e., B. A test is performed in step 365 to determine if the requested event is a single_state_of_high_probability event. If the event is not a single_state_of_high_probaility event then the process continues (step 410) with another logic process as denoted by C. If it is, then a test is performed in step 370 to determine if the event appears in a single_high_ probability state, i.e., a state that an event has much higher probability to appear. This logic process is particularly useful with great likelihood of time-saving when the requested event has a much higher probability to appear in a single state than the rest of the states in the state table. If the requested event does not appear in the single_high_ probability state then the current state is compared with the rest of the states for the requested event in step 375. If the result is true, the action as specified in the state table under the identified state and event are executed (step 380). Otherwise, a process to manage an abnormal communication request is invoked (step 390) before the process ends.

The three logic processes as described above take advantage of fact that a requested event may usually have certain designated functions to be performed. As a result of that 'event-dependent' functional requirements, the requested event has a predictable pattern to appear in some states in the state table. On the other hand, when the FSM is in a certain state, due to some special system characteristics of that state, there may be also some predictable patterns for an event to be included in that state. The following logic processes take advantage of that predictable 'state-dependent' correlation to further simplified and expedite the process of performing the tasks for network communication thus increases the rate of data transmission.

The 'state-dependent' situation may occur, for instance, when the FSM is in the states of either 'connection abort' or 'waiting'. Under these states, regardless of what are the requested event, a same sequence of actions is executed when the request for communication is received. The logic steps shown in FIG. 7 is particularly effective in handling these situations.

Figure 7:
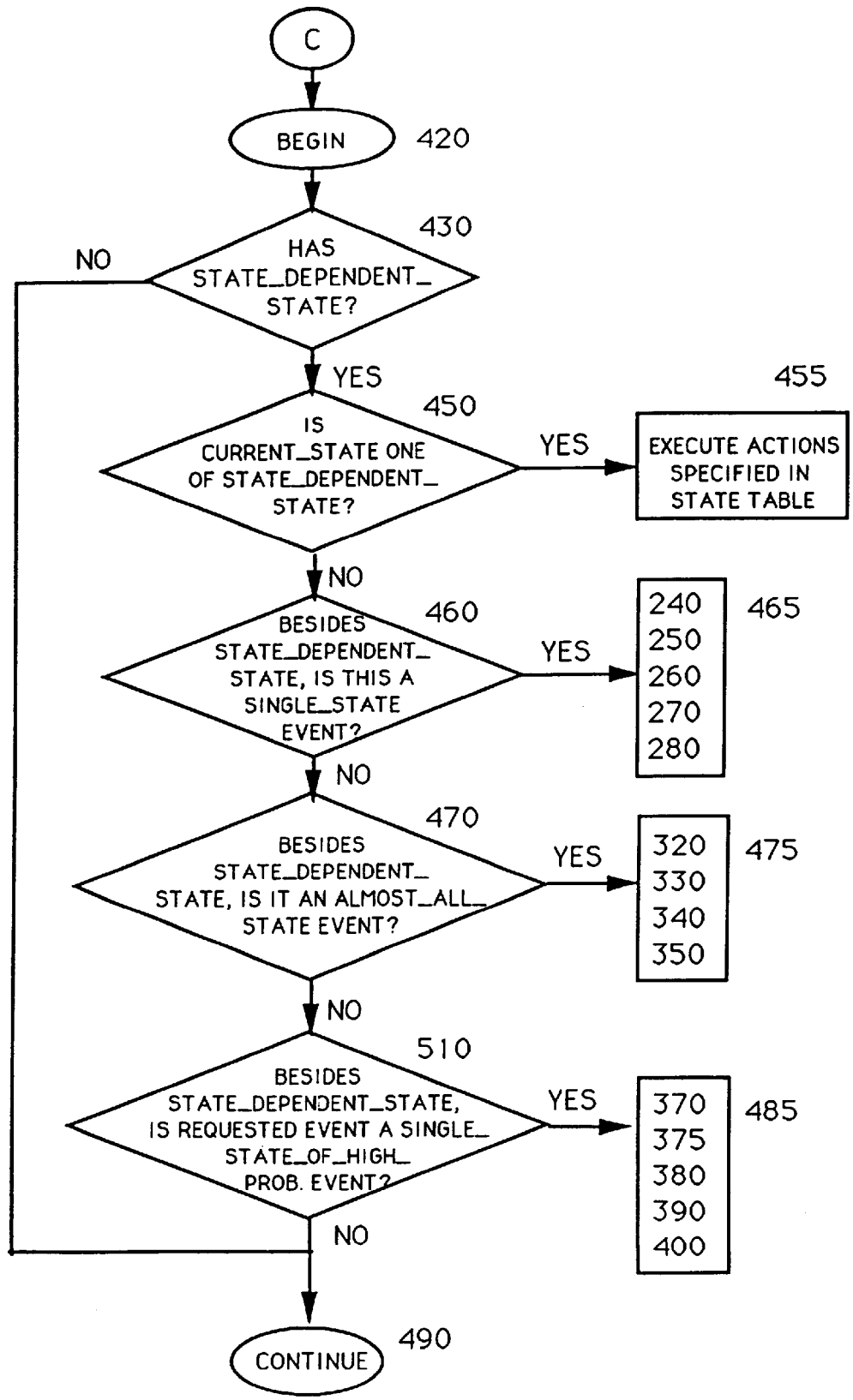
FIG. 7 shows a flow chart of a logic process of a state-dependent logic means.

FIG. 7 shows a logic process to manage the state-dependent processing. This logic step can begin (step 420) with either the requested connection_id and event as specified by steps 200 and 210 in FIG. 4, or it can continue with the process following step 410, i.e., C. A test is performed in step 430 to determine if there are state_dependent states in the state table, if the test result is negative then the process continues (step 490) with another process step, e.g., a table lookup process, as denoted by D. If the state table has state dependent states, a test is performed to determine if the current state is among one of these state dependent states (step 450). The actions defined in the state table under the identified state and event are executed (step 455) if the test result is true, otherwise, the process continues with next step, i.e., step 460. A test is performed to determine id the requested event is a single_state_event besides that it is a state_dependent event (step 460) and a sequence of processing steps, i.e., steps 240, 250, 260, 270 and 280 as specified in FIG. 4 are execute (step 465) if the test result is true. Otherwise, a second test is performed to determine if the event is an almost_all_state_event (step 470), and a sequence of processing steps, i.e., steps 320, 330, 340, and 350 as specified in FIG. 5 are execute (step 475) if the test result is true. Otherwise, a third test is performed to determine if the event is a single_state_of_high_prob._event (step 480) and a sequence of processing steps, i.e., steps 370, 375, 380, 390 and 400 as specified in FIG. 6 are execute (step 485) if the test result is true. Otherwise, the process continues (step 490) with another process step, e.g., a table lookup process, as denoted by D.

Depending on a specific implementation and the associated processor and network characteristics, the aforementioned logic processes may be flexibly arranged in different orders. The sequence of execution of these logic processes may even be dynamically rearranged in a real time manner to adaptively conform to the processors/network changes as a function of time.

Figure 1:
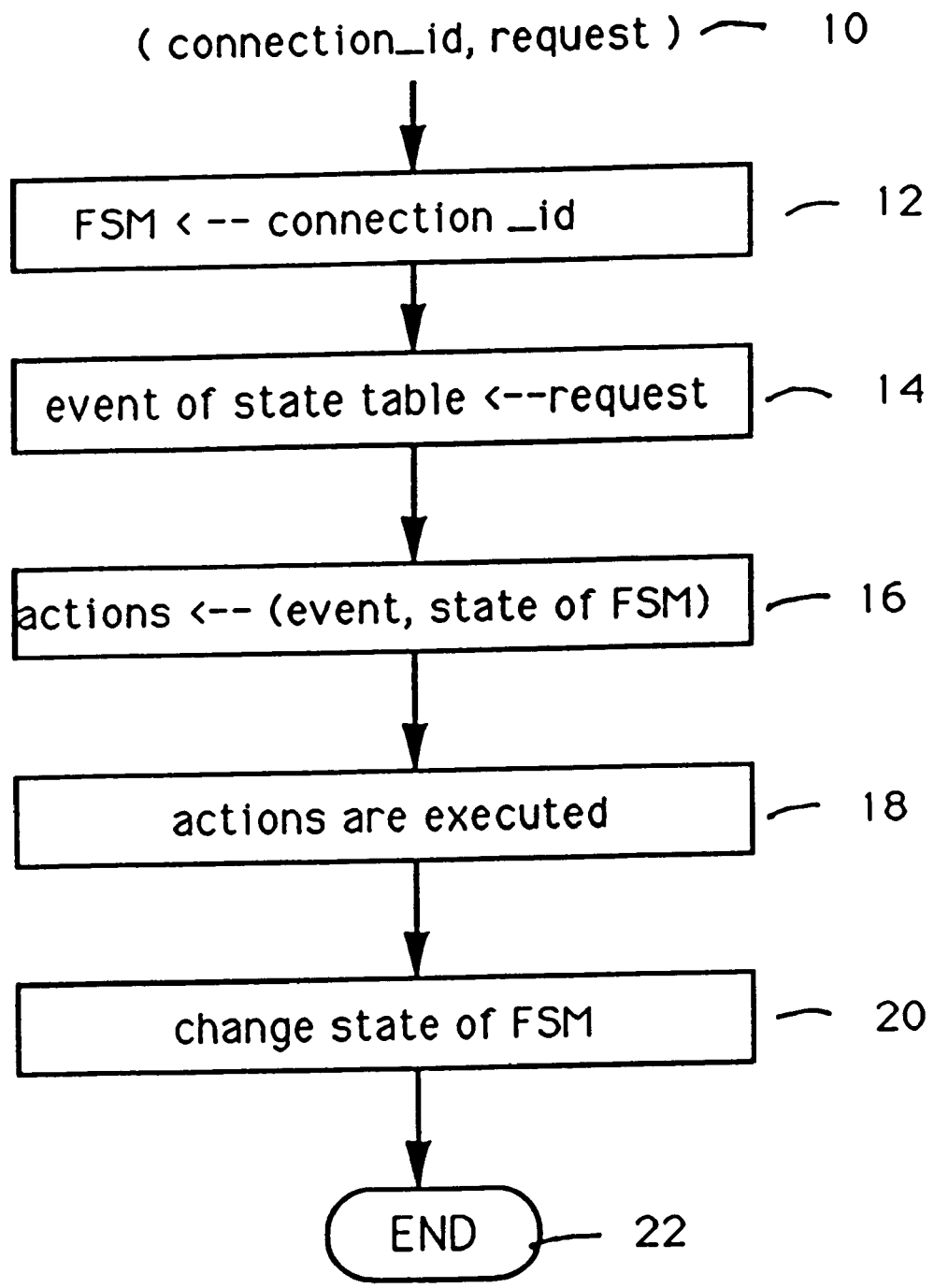
FIG. 1 is a flow chart showing the sequence of activities of a finite state machine after receiving a communication request.
Figure 8:
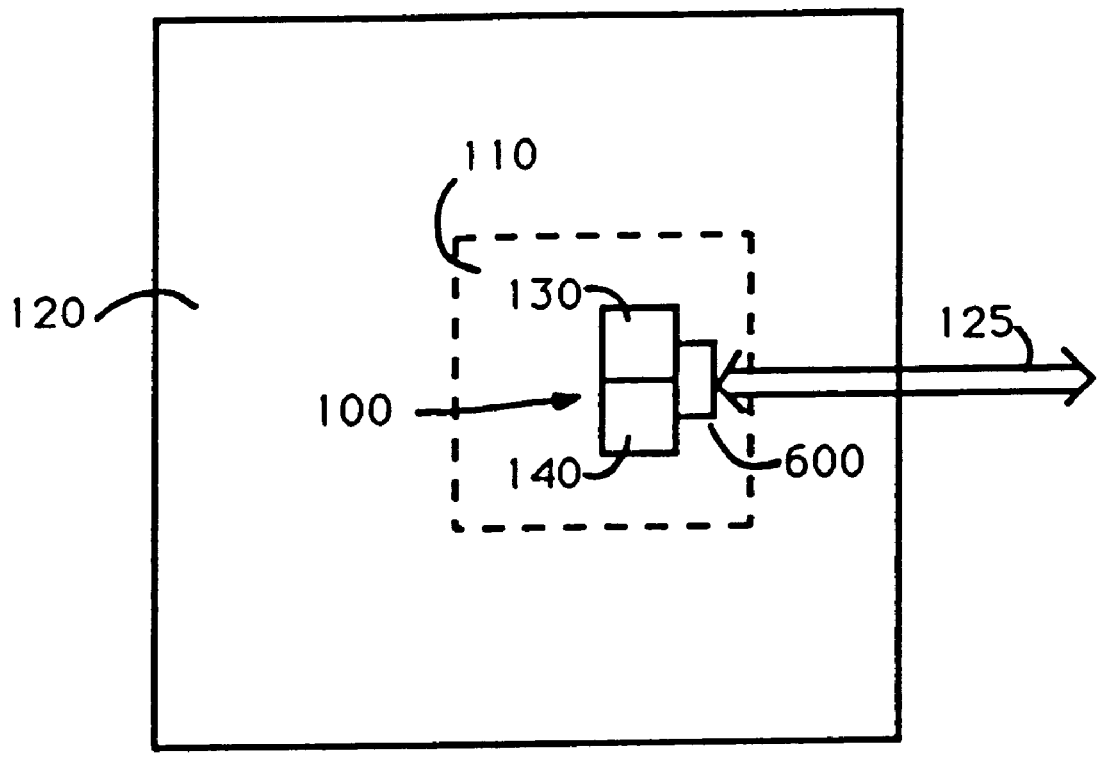
FIG. 8 shows a processor monitoring means for monitoring the operation of the processor and the finite state machine of FIG. 2.

Specifically, in one of a preferred embodiment, FIG. 8 shows a pre-processing means (or a processor monitoring means) 600 which is used to pre-process the incoming request or to monitor the operational characteristics of the processor 120 and the FSM 110 (FIG. 1) and to optimally invoke any of the above event-dependent or state-dependent logic processes.

The remaining entries in the state table after the above four logic processes are events that can appear in many states and that the likelihood of appearing in one state is about the same with other states. For these types of events and states, a table lookup means is used for the process of an incoming request. The table lookup means of the present invention is much more efficient than that of the prior art as demonstrated in FIGS. 9A to 9D. FIGS. 9A to 9C shows that a state table including seven events and seven states is first partitioned into a nested-select portion (FIG. 9B) and a table lookup portion (FIG. 9C). FIG. 9B shows the communication states that can be identified effectively by nested-selection logic processes based on the request event. FIG. 9C shows the communication states that cannot be identified effectively by nested-selection logic processes based on the request event and must be identified using a table lookup process through search of a two dimensional state-event data array as shown.

The table lookup portion is further reduced (FIG. 9D) by eliminating the null states where there are no events included in that states. Under state S1 and state S4 there are no event listed in the table lookup portion of the state table. By the use of a null-state elimination means, the table lookup portion of the state table is further reduced by eliminating states S1 and S4. Instead of six states to be processed as in the prior art, there are only four states after the elimination of these two null states in the present invention. Therefore, the number of entries in the final state table (FIG. 9D) as required to be processed by the table lookup means is greatly reduced as a result of the processes performed by the nested select means and the null-state elimination process. Consequently, the requirement of the data storage and the time required for search through the table are also reduced.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

TABLE 1

State Table of ISO 8073 Class 4 over CLNS

| EVENT | STATE | | | | | | | |
|---|---|---|---|---|---|---|---|---|
| | REFWAIT | CLOSED | WFCC | WBCL | OPEN | WFTRESP | AKWAIT | CLOSING |
| TCONreq | | not P0:<br>TDISind<br>CLOSED:<br>P0:<br>[1.3.10].CR<br>WFCC: | | | | | | |
| TCONresp | | | | | | [3.2.1.10].CC<br>AKWAIT | | |
| TDISreq | | | p4:<br>CLOSED:<br>(not P4) and P3:<br>WBCL:<br>(not P4) and (not P3):<br>[4.3.2.1.15]<br>CLOSING: | | [6.8.4.3.2.1.15]<br>CLOSING | [16]<br>CLOSED | [4.3.2.1.15]<br>CLOSING | |
| TDTreq<br>TEXreq | | | | | (16)<br>OPEN | | [20]<br>AKWAIT | |
| Retrans-<br>timer | | P7 and P3:<br>[0]<br>TDISind<br>REFWAIT:<br>P7 and (not P3):<br>[3.2.1.15]<br>TDISind<br>CLOSING:<br>not P7:<br>[1.3].CR<br>WFCC: | P7 and P3:<br>[0]<br>REFWAIT:<br>P7 and (not P3):<br>[3.2.1.15]<br>CLOSING:<br>not P7:<br>[1.3].CR<br>WBCL: | | P7:<br>[6.8.3.2.1.15]<br>TDISind<br>CLOSING:<br>not P7:<br>[16]<br>OPEN: | P7:<br>[3.2.1.15]<br>TDISind<br>CLOSING:<br>not P7:<br>[1.3].CC<br>AKWAIT: | P7:<br>[0]<br>REFWAIT:<br>not P7:<br>[1.3.15]<br>CLOSING: | |
| Inactivity-<br>Timer | | | | | [6.4.3.2.1.15]<br>TDISind<br>CLOSING(7) | | | |

TABLE 1-continued

State Table of ISO 8073 Class 4 over CLNS

| EVENT | REFWAIT | CLOSED | WFCC | WBCL | OPEN | WFTRESP | AKWAIT | CLOSING |
|---|---|---|---|---|---|---|---|---|
| Reference-Timer | CLOSED | | | | | | | |
| CR | | not P8:<br>[21]<br>CLOSED:<br>P8:<br>[1.9.3]<br>TCONind<br>WFTRESP(5): | | | [8.7]<br>OPEN | WFTRESP | CC<br>AKWAIT | CLOSING(13) |
| CC | DR<br>REFWAIT | DR<br>CLOSED | P9:<br>[9.2.4.5.7.17]<br>TCONconf(9)<br>OPEN:<br>not P9:<br>[4.3.2.1.15]<br>TDISind<br>CLOSING: | P9:<br>[2.4.3.1.15]<br>CLOSING: | [17.8.7]<br>(9)<br>OPEN | | | P9:<br>CR<br>CLOSING: |
| ER | REFWAIT | CLOSED | [0]<br>TDISind<br>REFWAIT | [0]<br>REFWAIT | [6.8.4.3.2.1.15]<br>TDISind<br>CLOSING | | [4.3.2.1.15]<br>TDISind<br>REFWAIT | [0]<br>REFWAIT |
| DR | [22]<br>REFWAIT | [22]<br>CLOSED | (8)<br>[0]<br>TDISind<br>REFWAIT | (8)<br>[0]<br>REFWAIT | DC(10)<br>TDISind<br>REFWAIT | DC(10)<br>TDISind<br>CLOSED | DC(10)<br>[0]<br>TDISind<br>REFWAIT | [0]<br>REFWAIT |
| DC | REFWAIT | CLOSED | | | | | | [0]<br>REFWAIT |
| EA | REFWAIT | CLOSED | | | [8.7]<br>OPEN(16) | | | CLOSING(13) |
| DT/AK/ED | REFWAIT | CLOSED | | | [8.7]<br>OPEN(16) | | [7]<br>OPEN<br>(15)(16) | CLOSING(13) |

I claim:

1. A data processor in one of a plurality of communication states for communicating with at least one of a plurality of networked processors, comprising:

communication state means for receiving and sending a plurality of communication request messages, each including a requested event, between the data processor and one of the plurality of networked processors; said communication state means including selection means for performing a series of logic processes and table-look-up means for searching through a data array for identifying a processor communication state of the data processor corresponding to said requested event for each of said plurality of communication request messages;

said communication state means further including means for arranging said table-look-up means and said selection means for performing said plurality of logic processes of identifying said processor communication state in a pre-arranged order for reducing the time required in identifying said processor communication state for carrying out a sequence of pre-programmed processor actions according to said requested event and said identified processor communication state in establishing a communication session for the data processor;

said selection means further including event-dependent logic means for determining if said requested event being event-dependent whereby said selection means performing a series of event-dependent logic processes for identifying said processor communication state corresponding to said requested event;

said selection means further including state-dependent logic means for determining if said requested event being state-dependent whereby said selection means performing a series of state-dependent logic processes for identifying said processor communication state corresponding to said requested event; and said event-dependent logic means further including almost_all_state logic means for determining if said requested event corresponding to substantially all of said communication states for identifying if one of said communication states being said processor communication state.

2. A data processor in one of a plurality of communication states for communicating with at least one of a plurality of networked processors, comprising:

communication state means for receiving and sending a plurality of communication request messages, each including a requested event, between the data processor and one of the plurality of networked processors;

said communication state means including selection means for performing a series of logic processes and table-look-up means for searching through a data array for identifying a processor communication state of the data processor corresponding to said requested event for each of said plurality of communication request messages;

said communication state means further including means for arranging said table-look-up means and said selection means for performing said plurality of logic processes of identifying said processor communication state in a pre-arranged order for reducing the time required in identifying said processor communication state for carrying out a sequence of pre-programmed processor actions according to said requested event and said identified processor communication state in establishing a communication session for the data processor;

said selection means further including event-dependent logic means for determining if said requested event being event-dependent whereby said selection means performing a series of event-dependent logic processes for identifying said processor communication state corresponding to said requested event;

said selection means further including state-dependent logic means for determining if said requested event being state-dependent whereby said selection means performing a series of state-dependent logic processes for identifying said processor communication state corresponding to said requested event; and said event-dependent logic means further including single_state_of_high_probability logic means for determining if said requested event having a high probability of being correspondent to a high-probability state for identifying if said high-probability state is said processor communication state.

3. A data processor in one of a plurality of communication states for communicating with at least one of a plurality of networked processors, comprising:

communication state means for receiving and sending a plurality of communication request messages, each including a requested event, between the data processor and one of the plurality of networked processors;

said communication state means including selection means for performing a series of logic processes and table-look-up means for searching through a data array for identifying a processor communication state of the data processor corresponding to said requested event for each of said plurality of communication request messages;

said communication state means further including means for arranging said table-look-up means and said selection means for performing said plurality of logic processes of identifying said processor communication state in a pre-arranged order for reducing the time required in identifying said processor communication state for carrying out a sequence of pre-programmed processor actions according to said requested event and said identified processor communication state in establishing a communication session for the data processor;

said selection means further including event-dependent logic means for determining if said requested event being event-dependent whereby said selection means performing a series of event-dependent logic processes for identifying said processor communication state corresponding to said requested event;

said selection means further including state-dependent logic means for determining if said requested event being state-dependent whereby said selection means performing a series of state-dependent logic processes for identifying said processor communication state corresponding to said requested event;

said state-dependent logic means further determining if said requested event corresponding to a waiting state for identifying said waiting state as said processor communication state; and said means for arranging said table-look-up means and said selection means in an arranged order being communication state monitoring means for dynamically monitoring said communication state of the data processor.

4. The data processor of claim 3 wherein:

said state-dependent state logic means further determining if said requested event corresponding to an abort state for identifying said abort state as said processor communication state.

5. The data processor of claim 4 wherein:

said table lookup means further being arranged for searching through said data array for identifying said processor communication state corresponding to said requested event after said selection means performing said series of logic processes.

6. A data processor in one of a plurality of communication states for communicating with at least one of a plurality of networked processors, comprising:

communication state means for receiving and sending a plurality of communication request messages, each including a requested event, between the data processor and one of the plurality of networked processors;

said communication state means including selection means for performing a series of logic processes and table-look-up means for searching through a data array for identifying a processor communication state of the data processor corresponding to said requested event for each of said plurality of communication request messages;

said communication state means further including means for arranging said table-look-up means and said selection means for performing said plurality of logic processes of identifying said processor communication state in a pre-arranged order for reducing the time required in identifying said processor communication state for carrying out a sequence of pre-programmed processor actions according to said requested event and said identified processor communication state in establishing a communication session for the data processor;

said selection means further including event-dependent logic means for determining if said requested event being event-dependent whereby said selection means performing a series of event-dependent logic processes for identifying said processor communication state corresponding to said requested event;

said selection means further including state-dependent logic means for determining if said requested event being state-dependent whereby said selection means performing a series of state-dependent logic processes for identifying said processor communication state corresponding to said requested event; and said communication state means further including pre-processing means for dynamically pre-processing said plurality of messages received from one of the plurality of networked processors for adaptively optimizing the sequence of application of said state-dependent logic means and said event-dependent logic means.

* * * * *